United States Patent
Okasinski et al.

(10) Patent No.: US 7,302,812 B2
(45) Date of Patent: Dec. 4, 2007

(54) PROCESS FOR PRODUCTION OF ISOTOPES

(75) Inventors: Matthew Joseph Okasinski, Harleysville, PA (US); David Ross Graham, Harleysville, PA (US); Adam Adrian Brostow, Emmaus, PA (US); Madhukar Bhaskara Rao, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 350 days.

(21) Appl. No.: 10/654,216

(22) Filed: Sep. 2, 2003

(65) Prior Publication Data

US 2005/0044886 A1    Mar. 3, 2005

(51) Int. Cl.
*F25J 3/00*    (2006.01)

(52) U.S. Cl. .......................... 62/617; 62/919

(58) Field of Classification Search ............ 62/919, 62/617
See application file for complete search history.

(56) References Cited

U.S. PATENT DOCUMENTS

| | | | | |
|---|---|---|---|---|
| 2,760,352 | A * | 8/1956 | Hachmuth | 62/630 |
| 3,087,791 | A * | 4/1963 | Becker | 423/580.2 |
| 3,098,732 | A * | 7/1963 | Wolcott | 62/637 |
| 3,126,267 | A * | 3/1964 | Vander | 62/617 |
| 3,216,800 | A | 11/1965 | Stouls | 23/212 |
| 3,789,112 | A * | 1/1974 | Pachaly | 423/580.2 |
| 4,353,871 | A * | 10/1982 | Bartlit et al. | 422/159 |
| 4,780,116 | A | 10/1988 | Cheh et al. | 55/386 |
| 4,976,938 | A | 12/1990 | Knize et al. | 423/249 |
| 5,122,163 | A | 6/1992 | Ide et al. | 55/16 |
| 5,505,829 | A | 4/1996 | Villa-Aleman | 204/157.2 |
| 6,297,415 | B1 * | 10/2001 | Brocker et al. | 585/260 |
| 6,297,417 | B1 * | 10/2001 | Samson et al. | 585/448 |
| 6,321,565 | B1 * | 11/2001 | Kihara et al. | 62/643 |
| 6,461,583 | B1 | 10/2002 | Hayashida et al. | |
| 6,835,287 | B1 * | 12/2004 | Kihara et al. | 202/154 |

FOREIGN PATENT DOCUMENTS

| | | |
|---|---|---|
| CH | 640148 | * 12/1983 |
| EP | 0293730 | 7/1992 |
| EP | 0 908 226 A2 | 4/1999 |
| EP | 1092467 | 4/2001 |
| GB | 932 178 | 7/1963 |
| WO | 9419829 | 9/1994 |

OTHER PUBLICATIONS

Andreev, B.M., et al, Atomic Energy, (1998) vol. 84, (3) pp. 186-189.

(Continued)

*Primary Examiner*—William C. Doerrler
(74) *Attorney, Agent, or Firm*—Lina Yang; Geoffrey L. Chase

(57) ABSTRACT

A process for producing an isotopically enriched compound of a desired isotope includes (a) providing a cryogenic reaction zone containing a catalyst adapted to catalyze an isotope exchange reaction at a cryogenic reaction temperature, (b) feeding to the cryogenic reaction zone an enriched mixture comprising at least a compound containing the desired isotope, wherein the enriched mixture is enriched in the desired isotope above a natural abundance of the desired isotope, (c) reacting the enriched mixture in the cryogenic reaction zone thereby forming a resulting mixture containing the isotopically enriched compound, and (d) separating the resulting mixture into an enriched product which is enriched in the isotopically enriched compound and a depleted product which is depleted in the isotopically enriched compound.

49 Claims, 3 Drawing Sheets

OTHER PUBLICATIONS

Clusius, V.K., et al, (1949) Z. Naturforsch, 4A, Nuclear Chem. Engrg., pp. 549-550.

Embury, M.C., et al, (1986) AIChE Symposium (251) vol. 82 pp. 13-18.

Fujiwara, H., (2000) J. Nuclear Sci. and Tech., vol. 37 (8) pp. 724-726.

Fujiwara, H. et al, (2001) Separation Sci. and Tech., vol. 36 (3) pp. 337-348.

Fukada, S., et al, (2000) J. Chromatography A, 898 pp. 125-131.

Fukada, S., et al, (1998) Fusion Engineering and Design 39-40 pp. 995-999.

Horen, A.S., et al, (1992) Fusion Technology, vol. 21 pp. 282-286.

Huang, T.J., et al, (1984) J. Chinese Inst. Of Chem. Eng., vol. 15 pp. 41-48.

Kanda, E., et al, (1958) vol. 4, Production of Nuclear Materials and Isotopes, UN, pp. 550-555.

Neffe, G., et al, (1998) Fusion Eng. And Design, vol. 39-40, pp. 987-993.

Rae, H.K., et al, (1978) ACS Symposium Series 68, Separation of Hydrogen Isotopes, pp. 1-26.

Sanchez, J., et al, (1996) Fundamentals of Inorganic Membrane Sci. and Tech., Chap. 11, pp. 529-569.

Strzelczyk, F., et al, (1998) J. of Chromatography A. 822 pp. 326-331.

Suzuki, Y., et al, (1993) Nuclear Technology, vol. 103, pp. 93-100.

Suzuki, Y., et al, (1984) J. At Energy Soc. Jpn., vol. 26 (9) pp. 802-810.

Suzuki, Y., et al, (1984) J. At Energy Soc. Jpn., vol. 26 (11) pp. 999-1004.

Timmerhaus, K.D., et al, (1989) Cryogenic Process Engineering, Chap. 6, Plenum Press NY, pp. 358-360.

Weaver, K., et al, (1974) Chem. Eng. Sci. vol. 29 pp. 11873-1882.

Wiswall, R.H., et al, (1972) Inorg. Chem. vol. 11 (7), pp. 1691-1695.

Wong, Y.W., et al, (1979) AIChE J. vol. 25 (4) pp. 592-599.

Wong, Y.W., et al, (1980) Sep. Sci. and Tech. vol. 15 (3), pp. 423-455.

Gorgoraki, V.I., et al (1964) Kinetics and Catalysis vol. 5 (1), "A Study of the Homomolecular . . . ", pp. 100-105.

Sandler, Y.L., et al, (1969) J. Phys. Chem. vol. 37 (7) pp. 2392-2396.

Sazonov, L.A., et al, (1966) Kinetics and Catalysis vol. 7 (2) pp. 255-259.

Verkin, B.I., Handbook of Properties of Condensed Phases of Hydrogen and Oxygen, Hemisphere Pub. NY (1991), p. 69.

Greenwood, N.N., et al, "Chemistry of the Elements," Butterworth Heinemann, Woburn, MA (1998) pp. 34-35.

Melander, L., et al, "Reaction Rates of Isotopic Molecules," Krieger Publishing Co. (1978) pp. 170-201.

Nishikawa, M., et al, Fusion Technology, vol. 28, Oct. 1995 pp. 711-716.

* cited by examiner

PROCESS FOR PRODUCTION OF ISOTOPES

BACKGROUND OF THE INVENTION

The present invention relates to a process for producing an isotope of an element and more particularly to isotopes of hydrogen and oxygen, specifically deuterium ($D_2$) and $^{18}O$.

Deuterium is a naturally occurring, stable isotope of hydrogen. Deuterium is found in very low concentrations in the environment; its concentration is only $150 \times 10^{-6}$ atomic fraction (natural abundance). The nucleus of deuterium contains one additional neutron, which results in differences in the physical and atomic properties when compared to hydrogen.

Deuterium can be made by the following exchange reaction: $2(HD)=H_2+D_2$.

Deuterium is useful in the following applications:

1. Replacement of hydrogen in any molecule due to the same electronic structure as hydrogen; deuterium is often used as a tracer atom to discern the reaction mechanism for chemical reactions. See Melander et al., *Reaction Rates of Isotopic Molecules*, Wiley, New York (1980).

2. Nuclear fuel in fusion nuclear reactors.

3. Preparation of heavy water; deuterated water ($D_2O$) is used in heavy water nuclear reactors. Deuterated water has less of a tendency to slow down neutron emitted during the fission reaction, thereby allowing the use of lower purity uranium fuel.

4. Replacement of hydrogen in annealing the silicon/silicon oxide gate interface in integrated circuits as described in WO 94/19829 to Lisenker et al. The bond dissociation energy of the Si-D bond is 72.3 Kcal/mol as compared to 71.5 Kcal/mol for the Si—H bond. This slight difference in bond energy is enough to prevent bond dissociation in the presence of high-energy electrons at the silicon/silicon oxide interface. This leads to substantially longer device lifetime for circuits annealed in deuterium versus those annealed in hydrogen.

5. Annealing optical fibers. The presence of O—H in glass fibers leads to substantial loss of signal in the near IR (1.3 to 1.55 μm). Fibers annealed in deuterium have O-D bonds, which are transparent in this region of the electromagnetic spectrum.

Isotopes can be produced by a variety of methods. One such method is a reactive separation process, which utilizes isotope-exchange-reaction equilibrium between gas and liquid components to affect isotope enrichment. The Girdler-Sulfide (GS) process is the most common method of deuterium enrichment to produce heavy water. The process utilizes the reaction between water and $H_2S$ as described by Rae, H. K. (1978), "Selecting Heavy Water Processes" in Separation of Hydrogen Isotopes, ACS Symposium Series 68, ACS, Washington, pp. 1–26. This process requires high liquid and gas flowrates (i.e. large vessels). In addition, the process requires handling corrosive streams.

Other reactive separation processes utilize $H_2/D_2$ gas mixtures reacting with ammonia, methylamine, or water in the presence of a catalyst to facilitate the exchange reaction. The exchange rate constant, even in the presence of the catalyst, is a factor of 10 to 100 times slower than the GS process. Thus, these reactive separation processes are less useful.

Another method for producing isotopes uses inorganic gas separation membranes comprising Pd at elevated temperatures. See, Sanchez et al., "Current Developments and Future Research in Catalytic Membrane Reactors," in Fundamentals of Inorganic Membrane Science and Technology Ed. by A. J. Burggraaf and L. Cot, Elsevier, Amsterdam, pp. 529–568 (1996); Suzuki et al., J. At Energy Soc. Jpn., 26 (1984), pps. 802 and 999; Suzuki et al., Nuclear Technology, 103 (1993), pp. 93–100.

Isotopes can also be produced by cryogenic processes.

U.S. Pat. No. 4,353,871 to Bartlit et al. describes a cryogenic distillation process for the separation of a mixture of hydrogen, $D_2$ and $T_2$ in which the concentration is approximately 50% $D_2$, 50% $T_2$ and 1% $H_2$. The system consists of four cryogenic distillation columns and two catalytic reactors for isotope exchange at room temperature. In the process, the overhead product containing HD is removed as waste, while the bottom output, HT and $D_2$, are removed and sent to a second reactor.

Embury et al., AIChE Symposium Series (251), vol. 82 (1986), pp. 13–18 described a cryogenic distillation process for recovering three isotopes of hydrogen from a mixed feed. The process is used to recover tritium from nuclear reactor waste streams. The process consists of three interconnected distillation columns and two catalytic isotope exchange reactors. The distillation columns are operated at about 24° K., and the exchange reactors filled with a platinum catalyst are operated at 300° K. Embury et al. does not disclose using a reactive distillation or a cryogenic exchange reaction.

Clusius et al., Z. Naturforsch, 4 A: 549 in Nuclear Chemical Engineering (1949) describe feeding cold hydrogen to a primary column and concentrate HD to 5%–10%. The HD-free hydrogen distillate is compressed and returned to the first column as reflux after first being used as a heat source for the reboilers. A smaller double column downstream purifies the HD in the bottom of the upper column in preparation for the exchange reaction. The HD exchange reaction was done in a separate fixed bed at room temperature. The reactor effluent is fed to the lower column where $D_2$ is recovered as a bottom output and the $H_2$—HD distillate is recycled back to the upper column. Several shortcomings of this process are inability to produce liquid $H_2$ and inability to use structured packing instead of trays in the distillation column.

Similar pilot plant experiments concentrating HD from natural hydrogen feed are further described. See, Timmerhaus et al., "Low Temperature Distillation of Hydrogen Isotopes", *Chem. Engr. Prog.*, 54(6) (1958), pp. 35–46; Timmerhaus et al., Cryogenic Process Engineering, Plenum Press, (1989), pp. 358–359. However, none of the above references disclosed a process wherein both the distillation and the exchange reaction are conducted at cryogenic temperatures.

The process disclosed in Timmerhaus et al. (1989) does not use a deuterium-depleted reflux in the distillation column. This results in deuterium losses due to immediate flash of the feed on the top tray. In addition, the overhead of the first column is used to condense the feed to the column, so that only gaseous hydrogen is produced. The feed is partly expanded to provide the reboiler duty to the first column and partly used to provide the reboiler duty in the $D_2$-sump of the second column.

Kanda et al., "Experimental Research on the Rectification of Liquid Hydrogen to Obtain Deuterium" in Proceedings of the Second United Nations International Conference on the Peaceful Uses of Atomic Energy 4:550 (1958) uses hydrogen as the cooling fluid and the primary column only achieves 90%–95% yield of HD from $H_2$.

U.S. Pat. No. 3,216,800 to Stouls describes a double distillation column to concentrate HD from 290 ppm to approximately 4 mol %. A second double column concentrates HD in the upper column and recovers $D_2$ and $T_2$ as a side stream and a bottom output of the lower column. The HD exchange reaction was done in a separate fixed bed at non-cryogenic temperatures. Deuterium yield was less than 50%.

Oxygen exchange reactions are known in the literature and oxygen isotope separation by distillation is also known in the prior art. The oxygen exchange reaction is analogous to the $H_2$ exchange reaction and can be described by the following equation:

$$2(^{16}O^{18}O) = 2(^{16}O) + 2(^{18}O)$$

Naturally existing $O_2$ contains 99.76% ($^{16}O$), 0.21% ($^{18}O$) and trace amounts of ($^{17}O$).

Gorgoraki et al. (1964) studied oxygen exchange on zinc oxide at 79° K (see "A Study of the Homomolecular Exchange of Oxygen on ZnO at Low Temperatures" Kinetics and Catalysis 5(1), pp.120–127). Gorgoraki et al. reported stable activity over several hours and an apparent activation energy of 0.18 kcal/mol. This activation energy is comparable to that of the hydrogen exchange reaction at 22° K. The ZnO catalyst was treated in vacuo at 400° C. for 6 hours, then the reaction vessel was cooled to −194° C. A non-equilibrium mixture of isotopic oxygen was introduced at −194° C. The initial rate is very high but after 2 minutes, the activity becomes stable and unchanged for 3 hours. The rate of exchange was 0.026 $e^{-4}$ mol/m² hr.

Sazonov et al. (1966) studied oxygen exchange on gadolinium oxide (see "Homomolecular and Isotopic Exchange of Oxygen on Gadolinium Oxide" Kinetics and Catalysis 7(2), pp. 284–288). Sazonov et al. reported an increase in reaction rate from upon change in temperature from 242° K to 195° K. The rate at 195° K is equivalent to that measured on ZnO. Sazonov et al. suggest that the rate of exchange at low temperatures is a function of the amount of adsorbed oxygen on the catalyst, which increases with decreasing temperature.

Sandler et al., (1969) observed that under certain pretreatment conditions of oxidized palladium, the oxygen equilibrium is reached within 7 minutes at both 273° K and 195° K ("The Low-Temperature Isotopic Oxygen Equilibration on Oxidized Palladium" J. Phys. Chem. 73(7), pp. 2392–2396). This experiment was done with an oxygen pressure of 3.6 Torr (0.48 KPa). A different pretreatment scheme resulted in the exchange reaction half-life of 10 minutes at 195° K and 5.2 Torr (0.69 KPa).

U.S. Pat. No. 6,321,565 by Kihara et al., and EP 1092467 by Kihara et al., disclose cryogenic distillation of oxygen isotopes. A closed loop heat integration scheme using nitrogen, oxygen, air or ASU exhaust gas as heat transfer fluid is disclosed.

EP 1092467 discloses an isotope "scrambler" for improving isotope enrichment and is placed intermediate in the oxygen distillation sequence. The "scrambler" is used to temporarily convert enriched heavy oxygen gas to enriched heavy water by an oxidation reaction occurring at non-cryogenic temperatures under an argon atmosphere. Then, the enriched heavy water was immediately dissociated by electrolysis, scrambling the isotopic composition. The resulting heavy oxygen gas was fed to the next cryogenic distillation column in the sequence for further purification. The $^{18}O$ yields were less than 10%.

Despite the foregoing developments, there is a need to provide an improved cost-efficient process of producing isotopes, particularly isotopes of hydrogen and oxygen in an improved yield.

All references cited herein are incorporated herein by reference in their entireties.

BRIEF SUMMARY OF THE INVENTION

The present invention is a process and an apparatus for producing an isotopically enriched compound of a desired isotope. There are several embodiments of the process of the invention and several variations of each of the embodiments.

In a first embodiment of the process for producing an isotopically enriched compound of a desired isotope, the process comprises (a) providing a cryogenic reaction zone containing a catalyst adapted to catalyze an isotope exchange reaction at a cryogenic reaction temperature, (b) feeding to the cryogenic reaction zone an enriched mixture comprising at least a compound containing the desired isotope, wherein the enriched mixture is enriched in the desired isotope above a natural abundance of the desired isotope, (c) reacting the enriched mixture in the cryogenic reaction zone thereby forming a resulting mixture containing the isotopically enriched compound, and (d) separating the resulting mixture into an enriched product which is enriched in the isotopically enriched compound and a depleted product which is depleted in the isotopically enriched compound. Preferably, the enriched mixture is present in an enriched mixture amount of at least about 1 mol %.

There are many variations of the first embodiment of the process of the invention. In one variation, the cryogenic reaction temperature in the cryogenic reaction zone is less than about 125° K and the pressure in the cryogenic reaction zone is below about 30 psia. Preferably, the cryogenic reaction temperature is less than about 75° K and the pressure in the cryogenic reaction zone is below about 30 psia and more preferably, the cryogenic reaction temperature is at most about 22° K at the pressure of below about 30 psia.

In another variation of the first embodiment of the process of the invention, the desired isotope is a member selected from a group consisting of H, D, T, $^{16}O$, $^{17}O$, and $^{18}O$, the compound containing the desired isotope is a member selected from a group consisting of HD, HT, DT, $^{16}O^{18}O$, $^{16}O^{17}O$, and the isotopically enriched compound is a member selected from a group consisting of $H_2$, $D_2$, $T_2$, $^{16}O_2$, $^{17}O_2$, and $^{18}O_2$.

In yet another variation of the first embodiment of the process of the invention, the process further includes providing a first cryogenic distillation column having a first bottom portion and a first overhead portion, feeding to the first cryogenic distillation column a feed mixture comprising the compound containing the desired isotope in a feed isotope amount, separating at least a portion of the compound containing the desired isotope, thereby obtaining the enriched mixture and a depleted mixture, wherein the depleted mixture is depleted in the compound containing the desired isotope, removing the enriched mixture from the first cryogenic distillation column, and removing the depleted mixture from the first cryogenic distillation column.

In another variation of the first embodiment of the process of the invention, the process even further includes providing a reactive distillation column, wherein the cryogenic reaction zone is positioned within the reactive distillation column, wherein the reactive distillation column has a catalytic and a non-catalytic inner contacting surface for facilitating simultaneously an isotope exchange reaction and a distillation process, and wherein reacting the enriched mixture and separating the enriched product and the depleted product are conducted simultaneously in the reactive distillation column.

In certain variations of the first embodiment of the process of the invention, the feed mixture is a gas fed at a temperature of about 125° K to about 19° K at a pressure of below about 30 psia, more preferably, the feed mixture is a cryogenic liquid fed at a temperature of about 125° K to about 19° K at a pressure of below about 30 psia, preferably, the cryogenic reaction temperature is at most about 75° K at a pressure of below about 30 psia and more preferably, the cryogenic reaction temperature is at most about 22° K at a pressure of below about 30 psia.

In certain variations of the first embodiment of the process of the invention, the enriched product contains at least 95% of the isotopically enriched compound. Preferably, the isotopically enriched compound is $D_2$, the compound containing the desired isotope is HD, and the desired isotope is D. In certain variations of the first embodiment of the process of the invention, the feed mixture comprises at least 50% of para-$H_2$. In certain variations of the first embodiment of the process of the invention, the isotopically enriched compound is $^{18}O_2$, the compound containing the desired isotope is $^{16}O^{18}O$, and the desired isotope is $^{18}O$.

In certain variations of the first embodiment of the process of the invention, at least a portion of the enriched mixture and/or at least a portion of the depleted mixture are returned to the first cryogenic distillation column to provide a liquid reflux, thereby recycling the at least a portion of the enriched mixture and/or the at least a portion of the depleted mixture. The liquid reflux can be provided by a variety of ways. Preferably, the liquid reflux is obtained by compressing the at least a portion of the enriched mixture or the at least a portion of the depleted mixture, thereby forming a compressed overhead output, condensing the compressed overhead output, thereby forming a condensed overhead product, transferring heat of condensation to the first bottom portion of the first cryogenic distillation column, thereby providing boilup, and returning at least a portion of the condensed overhead product to the first overhead portion of the first cryogenic distillation. Additionally, the liquid reflux can be obtained by condensing at least a portion of the enriched mixture or the at least a portion of the depleted mixture against a boiling refrigerant, compressing the boiling refrigerant, and condensing the boiling refrigerant by transferring heat to the first bottom portion of the first cryogenic distillation column, thereby providing boilup.

In yet another variation of the first embodiment of the process of the invention, in addition to providing a first cryogenic distillation column, the process further includes providing a second cryogenic distillation column having a second bottom portion and a second overhead portion and a third cryogenic distillation column having a third bottom portion and a third overhead portion, feeding the enriched mixture from the first cryogenic distillation column to the second distillation column, separating at least a portion of the compound containing the desired isotope from the enriched mixture, thereby forming a second enriched mixture comprising at least a compound containing the desired isotope and a second depleted mixture, wherein the second depleted mixture is depleted in the compound containing the desired isotope, provided that the second enriched mixture is enriched in the desired isotope in a second enriched mixture amount which exceeds the enriched mixture amount, removing the second enriched mixture from the second cryogenic distillation column, feeding the second enriched mixture to the cryogenic reaction zone, provided that the cryogenic reaction zone is positioned in a cryogenic vessel, thereby forming the resulting mixture containing the isotopically enriched compound, directing the resulting mixture to the third cryogenic distillation column, thereby obtaining the enriched product and the depleted product, collecting the enriched product from the reactive distillation column, and removing the depleted product from the reactive distillation column.

Similarly to the variation described immediately above, at least a portion of the enriched mixture and/or at least a portion of the depleted mixture are returned to the first cryogenic distillation column to provide a liquid reflux, thereby recycling the at least a portion of the enriched mixture and/or the at least a portion of the depleted mixture. The liquid reflux can be provided by a variety of ways. Preferably, the liquid reflux is obtained by compressing the at least a portion of the enriched mixture or the at least a portion of the depleted mixture, thereby forming a compressed overhead output, condensing the compressed overhead output, thereby forming a condensed overhead product, transferring heat of condensation to the first bottom portion of the first cryogenic distillation column, thereby providing boilup, and returning at least a portion of the condensed overhead product to the first overhead portion of the first cryogenic distillation. Additionally, the liquid reflux can be obtained by condensing at least a portion of the enriched mixture or the at least a portion of the depleted mixture against a boiling refrigerant, compressing the boiling refrigerant, and condensing the boiling refrigerant by transferring heat to the first bottom portion of the first cryogenic distillation column, thereby providing boilup. Preferred conditions for this variation include the feed mixture being a gas fed at a temperature of about 125° K to about 19° K at a pressure of below about 30 psia, or the feed mixture being a cryogenic liquid fed at a temperature of about 125° K to about 19° K at a pressure of below about 30 psia. Preferably, the cryogenic reaction temperature is at most about 75° K, and more preferably at most about 22° K measured at a pressure of below about 30 psia. In one variation, the enriched product contains at least 95% of the isotopically enriched compound. In the preferred embodiment, the isotopically enriched compound is $D_2$, the compound containing the desired isotope is HD, and the desired isotope is D. In one variation of the above variation, the feed mixture comprises at least 50% of para-$H_2$. Preferably, the isotopically enriched compound is $^{18}O_2$, the compound containing the desired isotope is $^{16}O^{18}O$, and the desired isotope is $^{18}O$.

The second embodiment of the process of the invention is process for producing an enriched mixture containing $D_2$ and/or HD, the process comprising: providing a cryogenic distillation column; feeding to the cryogenic distillation column a liquid $H_2$, comprised predominantly of para-$H_2$; removing a compound depleted in $D_2$ and/or HD from the cryogenic distillation column; and removing the enriched mixture enriched in $D_2$ and/or HD from the cryogenic distillation column.

In one variation of the second embodiment of the process of the invention, the enriched mixture is further enriched in $D_2$ by providing a cryogenic reaction zone containing a catalyst adapted to catalyze an isotope exchange reaction.

There are several embodiments of the apparatus to perform the process of the invention. In the first embodiment of the apparatus, the apparatus comprises (a) a cryogenic reaction zone adapted to produce a resulting mixture containing an isotopically enriched compound of a desired isotope; (b) a source of an enriched mixture for feeding to the cryogenic reaction zone, the enriched mixture comprising at least a compound containing the desired isotope, wherein the enriched mixture is enriched in the desired isotope above a natural abundance of the desired isotope, the source being in communication with the cryogenic reaction zone; (c) a separating vessel for separating the resulting mixture into an enriched product enriched in the isotopically enriched compound and a depleted product depleted in the isotopically enriched compound, the separating vessel being in communication with the cryogenic reaction zone; and (d) a first outlet for removing the enriched product and a second outlet for removing the depleted product, the first outlet and the second outlet being in communication with the separating vessel.

The second embodiment of the apparatus of the invention is an apparatus for producing an isotopically enriched compound of a desired isotope, said apparatus comprising: (a) a cryogenic reaction zone containing a catalyst adapted to catalyze an isotope exchange reaction at a cryogenic reaction temperature, the cryogenic reaction zone is adapted to produce a resulting mixture containing the isotopically enriched compound; (b) a source of an enriched mixture for feeding to the cryogenic reaction zone, the enriched mixture comprising at least a compound containing the desired isotope, wherein the enriched mixture is enriched in the desired isotope above a natural abundance of the desired isotope, the source being in communication with the cryogenic reaction zone; (c) a separating vessel for separating the resulting mixture into an enriched product enriched in the isotopically enriched compound and a depleted product depleted in the isotopically enriched compound, the separating vessel being in communication with the cryogenic reaction zone; and (d) a first outlet for removing the enriched product and a second outlet for removing the depleted product, the first outlet and the second outlet being in communication with the separating vessel.

In another variation of the second embodiment of the apparatus of the invention, the source of the enriched mixture comprises a first cryogenic distillation column, the first cryogenic distillation column having a first bottom portion and a first overhead portion, and wherein the first cryogenic distillation column is adapted to receive a feed mixture comprising the compound containing the desired isotope in a feed isotope amount and to separate at least a portion of the compound containing the desired isotope, and thereby obtain the enriched mixture and a depleted mixture, the depleted mixture is depleted in the compound containing the desired isotope.

In another variation of the second embodiment of the apparatus of the invention, the separating vessel comprises a reactive distillation column adapted to contain the cryogenic reaction zone within the reactive distillation column, wherein the reactive distillation column has a catalytic and a non-catalytic inner contacting surface for facilitating simultaneously an isotope exchange reaction and a distillation process, and wherein reacting the enriched mixture and separating the enriched product and the depleted product are conducted simultaneously in the reactive distillation column.

In another variation of the second embodiment of the apparatus of the invention, the apparatus further comprises a recycling unit, the recycling unit adapted to return at least a portion of the enriched mixture and/or at least a portion of the depleted mixture to the first cryogenic distillation column to provide a liquid reflux. Preferably, the recycling unit comprises a compressor to compress the at least a portion of the enriched mixture or the at least a portion of the depleted mixture, and thereby form a compressed overhead output; a condenser to condense the compressed overhead output, and thereby form a condensed overhead product; a conduit for transferring heat of condensation to the first bottom portion of the first cryogenic distillation column, and thereby providing boilup; and a conduit for returning at least a portion of the condensed overhead product to the first overhead portion of the first cryogenic distillation. In another variation, the recycling unit comprises: a condenser adapted to condense at least a portion of the enriched mixture or the at least a portion of the depleted mixture against a boiling refrigerant; a compressor adapted to compress the boiling refrigerant; and a conduit for condensing the boiling refrigerant by transferring heat to the first bottom portion of the first cryogenic distillation column, and thereby providing boilup.

In yet another variation of the second embodiment of the apparatus of the invention, the apparatus further comprises a second cryogenic distillation column having a second bottom portion and a second overhead portion, the second distillation column being in communication with the first distillation column and adapted to produce a second enriched mixture comprising at least a compound containing the desired isotope and a second depleted mixture, wherein the second depleted mixture is depleted in the compound containing the desired isotope, provided that the second enriched mixture is enriched in the desired isotope in a second enriched mixture amount which exceeds the enriched mixture amount; a cryogenic vessel adapted to contain the cryogenic reaction zone, the cryogenic vessel is in communication with the second cryogenic distillation column; and a third cryogenic distillation column having a third bottom portion and a third overhead portion, the third cryogenic distillation column adapted to serve as the separating vessel, the third cryogenic distillation column being in communication with the cryogenic vessel.

In yet another variation of the above variation, the apparatus further comprises a recycling unit, the recycling unit adapted to return at least a portion of the enriched mixture and/or at least a portion of the depleted mixture to the first cryogenic distillation column to provide a liquid reflux. Preferably, the recycling unit comprises: a compressor adapted to compress the at least a portion of the enriched mixture or the at least a portion of the depleted mixture, and thereby form a compressed overhead output; a condenser adapted to condense the compressed overhead output, and thereby form a condensed overhead product; a conduit for transferring heat of condensation to the first bottom portion of the first cryogenic distillation column, and thereby providing boilup; and a conduit for returning at least a portion of the condensed overhead product to the first overhead portion of the first cryogenic distillation. In yet another variation, the recycling unit comprises: a condenser adapted to condense at least a portion of the enriched mixture or the at least a portion of the depleted mixture against a boiling refrigerant; a compressor to compress the boiling refrigerant; and a conduit for condensing the boiling refrigerant by transferring heat to the first bottom portion of the first cryogenic distillation column, and thereby providing boilup.

The third embodiment of the apparatus of the invention is an apparatus for producing an enriched mixture containing $D_2$ and/or HD, the apparatus comprising: a cryogenic distillation column; a source of a liquid $H_2$, wherein the liquid $H_2$ comprises predominantly of para-$H_2$, the source being in communication with the cryogenic distillation column; and a first outlet for removing a compound depleted in $D_2$ and/or HD and a second outlet for removing the enriched mixture enriched in $D_2$ and/or HD, the first outlet and the second outlet being in communication with the cryogenic distillation column.

In another variation of the third embodiment of the apparatus of the invention, the apparatus further comprising a cryogenic reaction zone containing a catalyst adapted to catalyze an isotope exchange reaction.

The fourth embodiment of the apparatus of the invention is an apparatus for producing an isotopically enriched compound of a desired isotope, comprising: (a) a cryogenic reaction zone containing a catalyst adapted to catalyze an isotope exchange reaction at a cryogenic reaction temperature; (b) means for feeding to the cryogenic reaction zone an enriched mixture comprising at least a compound containing the desired isotope, wherein the enriched mixture is enriched in the desired isotope above a natural abundance of the desired isotope; (c) means for reacting the enriched mixture in the cryogenic reaction zone thereby forming a resulting mixture containing the isotopically enriched compound; and (d) means for separating the resulting mixture into an enriched product which is enriched in the isotopically enriched compound and a depleted product which is depleted in the isotopically enriched compound.

The fifth embodiment of the apparatus of the invention is an apparatus for producing an enriched mixture containing $D_2$ and/or HD comprising: a cryogenic distillation column; means for feeding to the cryogenic distillation column a liquid $H_2$, comprised predominantly of para-$H_2$; means for removing a compound depleted in $D_2$ and/or HD from the cryogenic distillation column; and means for removing the enriched mixture enriched in $D_2$ and/or HD from the cryogenic distillation column.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
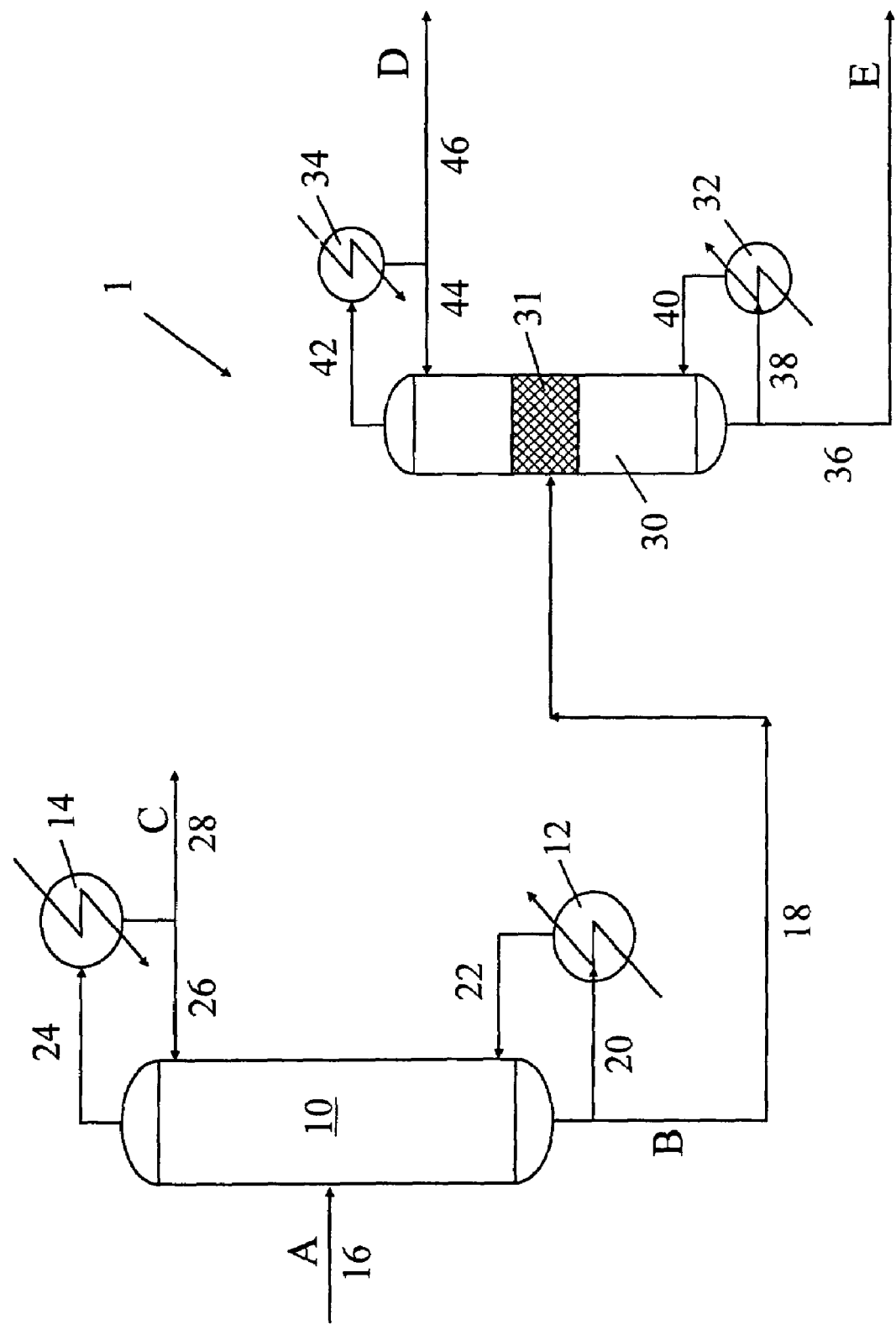
FIG. 1 is an isotope separation process showing a cryogenic distillation column, a reactive distillation column and recycling of outputs.

This invention is directed to a process for producing an isotopically enriched compound of a desired isotope, using a process sequence including a cryogenic reaction zone.

The invention was driven by the desire to develop a process wherein isotopically enriched compounds of desired isotopes are produced in a high yield of at least 95%, at a faster rate and in a cost-efficient manner. The present invention flows from the discovery that the process conditions can be optimized by enriching the feed in the desired isotope above its natural abundance, thereby creating an enriched mixture. Preferably, the enriched mixture contains at least about 1 mol % of the desired isotope, more preferably at least 10 mol %.

Advantageously, the present invention can be used for the simultaneous production of two valuable products e.g., deuterium and liquid hydrogen, whereas previous methods yield only one valuable product e.g., deuterium. The additional product e.g., liquid hydrogen, is produced with modest additional energy consumption and without additional process complexity.

Inventors discovered at least two advantages of using reactive distillation process for isotope exchange reactions. First, due to boiling point differences of products of the isotope exchange reaction, i.e., preferably $^{16}O_2$ and $^{18}O_2$ or $H_2$ and $D_2$, any equilibrium limitation can be overcome by removing the products as they are formed. Second, nearly complete conversion can be obtained because the compound containing the desired isotope (the reactant), preferably $^{16}O^{18}O$ or HD, boils at an intermediate temperature relative to that of the products and therefore is being "trapped" within the column. Using the reactive distillation column for production of isotopes yields an output enriched in the desired isotope with at least about 95% molar recovery and preferably about 99% molar recovery.

In one of the embodiments of the process of the invention, the process comprises (a) providing a cryogenic reaction zone containing a catalyst adapted to catalyze an isotope exchange reaction at a cryogenic reaction temperature, (b) feeding to the cryogenic reaction zone an enriched mixture comprising at least a compound containing the desired isotope, wherein the enriched mixture is enriched in the desired isotope above a natural abundance of the desired isotope, (c) reacting the enriched mixture in the cryogenic reaction zone thereby forming a resulting mixture containing the isotopically enriched compound, and (d) separating the resulting mixture into an enriched product which is enriched in the isotopically enriched compound and a depleted product which is depleted in the isotopically enriched compound.

The cryogenic reaction zone contains a catalyst adapted to catalyze an isotope exchange reaction at a cryogenic reaction temperature. Preferably the cryogenic reaction temperature in the cryogenic reaction zone is less than about 125° K and the pressure in the cryogenic reaction zone is below about 30 psia, more preferably the cryogenic reaction temperature is less than about 75° K at the same pressure and most preferably, the cryogenic reaction temperature is at most about 22° K at the same pressure.

In a preferred embodiment, the desired isotopes include H, D, T, $^{16}O$, $^{17}O$, and $^{18}O$, the compounds containing the desired isotope include of HD, HT, DT, $^{16}O^{18}O$, $^{16}O^{17}O$, and the isotopically enriched compounds include $H_2$, $D_2$, $T_2$, $^{16}O_2$, $^{17}O_2$, and $^{18}O_2$.

One of the embodiments of the process of the invention is shown in FIG. 1 and further includes providing a first cryogenic distillation column having a first bottom portion and a first overhead portion, feeding to the first cryogenic distillation column a feed mixture comprising the compound containing the desired isotope in a feed isotope amount, separating at least a portion of the compound containing the desired isotope, thereby obtaining the enriched mixture and a depleted mixture, wherein the depleted mixture is depleted in the compound containing the desired isotope, removing the enriched mixture from the first cryogenic distillation column, and removing the depleted mixture from the first cryogenic distillation column.

In this embodiment, as shown in FIG. 1, the cryogenic reaction zone is positioned within a reactive distillation column. The reactive distillation column has a catalytic and a non-catalytic inner contacting surface for facilitating simultaneously an isotope exchange reaction and a distillation process, and wherein reacting the enriched mixture and separating the enriched product from the depleted product are conducted simultaneously in the reactive distillation column.

The feed mixture comprising the compound containing the desired isotope in a feed isotope amount is fed to a first cryogenic distillation column 10 via line 16 to produce the enriched mixture. In one embodiment of the present invention, the feed mixture comprises $H_2$, $D_2$, and HD wherein the initial isotope concentration in the feed mixture is about 150 ppm atomic fraction, which is the natural abundance of $D_2$. The concentrations of HD and $D_2$ in the feed are approximately 290 ppm and 22.5 ppb, respectively.

Next, the enriched mixture is removed from the bottom portion of the first cryogenic distillation column 10 via line 18 and is feed to the cryogenic reaction zone 31 located in the reactive distillation column 30. Also, an overhead output comprising the depleted mixture is removed from the first overhead portion of the first cryogenic distillation column 10 via line 24. The first overhead output is condensed in a condenser 14, and at least a part of the condensed first overhead output is recycled back to the top portion of the first cryogenic distillation column 10 to provide an isotope depleted liquid reflux via line 26. At least a part of the condensed overhead output is collected via line 28.

At least a part of the enriched mixture is sent to a reboiler 12 via line 20 and is recycled back to the first cryogenic distillation column 10 via line 22.

The cryogenic reaction zone 31 contains a catalyst, preferably a metal or metal oxide catalyst adapted to catalyze an isotope exchange reaction, preferably a reaction of HD to form $H_2$ and $D_2$ or a reaction of $^{16}O^{18}O$ to form $^{18}O_2$ and $^{16}O_2$. Preferably, the catalyst is a member selected from the group consisting of Ni, Cu, Pt, Pd, V and oxides thereof.

The exchange reaction is conducted at cryogenic temperatures of less than about 125° K and the pressure in the cryogenic reaction zone is below about 30 psia, more preferably the cryogenic reaction temperature is less than about 75° K and most preferably, the cryogenic reaction temperature is at most about 22° K.

Equilibrium of the exchange reaction is shifted by removing the products as they are formed due to their boiling point differences. These boiling point differences also allows the isotopes to be separated in two outputs, i.e., the output enriched in the desired isotope and the output depleted in the desired isotope.

In the reactive distillation column 30, the isotopically enriched compounds migrate out of the cryogenic reaction zone 31 and are purified further in the other sections of the reactive distillation column 30. The bottom output 36 of the reactive distillation column 30 is a desired product, which is enriched in the desired isotope with at least 95% recovery.

At east a part of the bottom output 36 is sent to a reboiler 32 via line 38 and is recycled back to the reactive distillation column 30 via line 40.

The overhead output of the reactive distillation column 30 is removed via line 42 and condensed in a condenser 34, wherein at least a part of it is recycled back to the reactive distillation column 30 to provide a liquid reflux via line 44. At least a part of the condensed overhead output is collected via line 46.

Figure 3:
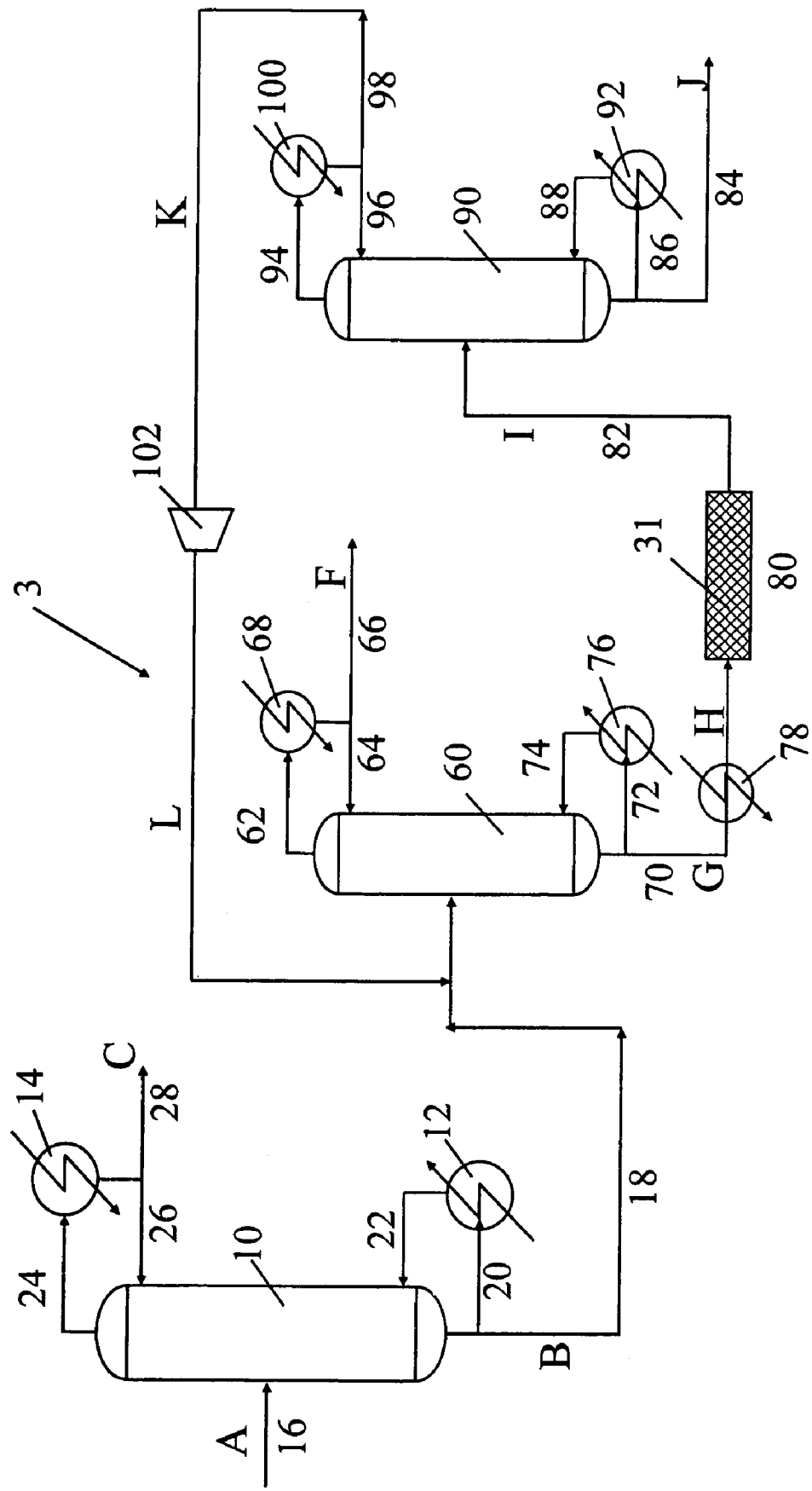
FIG. 3 is an isotope separation process showing three cryogenic distillation columns, an exchange reactor and recycling of outputs.

In another embodiment of the process of the invention, as shown in FIG. 3, the cryogenic reaction zone is positioned in a cryogenic vessel, e.g. an exchange reactor which is separate from the cryogenic distillation column, wherein the cryogenic vessel is operated at the cryogenic temperature of less than about 125° K and the pressure in the cryogenic reaction zone is below about 30 psia, more preferably the cryogenic reaction temperature is less than about 75° K and most preferably, the cryogenic reaction temperature is at most about 22° K. This process requires at least two cryogenic distillation columns to sufficiently enrich the original feed mixture in the desirable isotope.

First step of the process is similar to that described above (see FIG. 1), wherein the feed mixture is fed to a first cryogenic distillation column 10 via line 16 to obtain the enriched mixture.

The enriched mixture is removed from the bottom portion of the first cryogenic distillation column 10 via line 18 and fed to a second cryogenic distillation column 60 to separate at least a portion of the compound containing the desired isotope from the enriched mixture, thereby forming a second enriched mixture comprising at least a compound containing the desired isotope and a second depleted mixture, wherein the second depleted mixture is depleted in the compound containing the desired isotope.

From the second cryogenic distillation column 60, the second depleted mixture is removed via line 62 and a second enriched mixture is removed via line 70. The second cryogenic distillation column is operated at the cryogenic temperature of less than about 125° K and the pressure is below about 30 psia, more preferably the cryogenic reaction temperature is less than about 75° K and most preferably, the cryogenic reaction temperature is at most about 22° K.

The second depleted mixture is condensed in a condenser 68, and at least a part of it is recycled back to the second distillation column 60 to provide a liquid reflux via line 64. At least a part of the condensed second depleted mixture is collected via line 66.

At least a part of the second enriched mixture is sent to a reboiler 76 via line 72 and is recycled back to the second distillation column 60 via line 74.

The second enriched mixture is further treated in the apparatus 78 (e.g., a refrigerator) and is fed to a cryogenic reaction zone positioned in a cryogenic vessel 80. The exchange reaction is conducted at cryogenic temperatures of less than about 125° K and the pressure in the cryogenic reaction zone is below about 30 psia, more preferably the cryogenic reaction temperature is less than about 75° K and most preferably, the cryogenic reaction temperature is at most about 22° K.

Next, the equilibrium mixture is directed to the third cryogenic distillation column 90 via line 82 for further separation and to obtain a product output and a third depleted mixture. The product output comprising at least a compound containing the desired isotope and a third depleted mixture depleted in the compound containing the desired isotope. The third cryogenic distillation column is operated at a third cryogenic distillation column temperature of less than about 125° K and the pressure of below about 30 psia, more preferably the temperature is less than about 75° K and most preferably, the temperature is at most about 22° K. Finally, the product output from the third bottom portion and the third depleted mixture from the third overhead portion of the third reactive distillation column are collected. The product contains the desired isotope with at least 95% recovery.

At least a portion of the product output 94 is further sent to a condenser 102 via line 94 and is recycled back via line 98 to be added to the feed of the second cryogenic distillation column 60. In addition, at least a portion of the third depleted mixture is returned back to the third cryogenic distillation column 90 via line 96 as a reflux.

At least a part of the bottom output 84 is sent to a reboiler 92 via line 86 and is recycled back to the third distillation column 90 via line 88. The bottom output 84 containing the desired isotope is collected.

Figure 2:
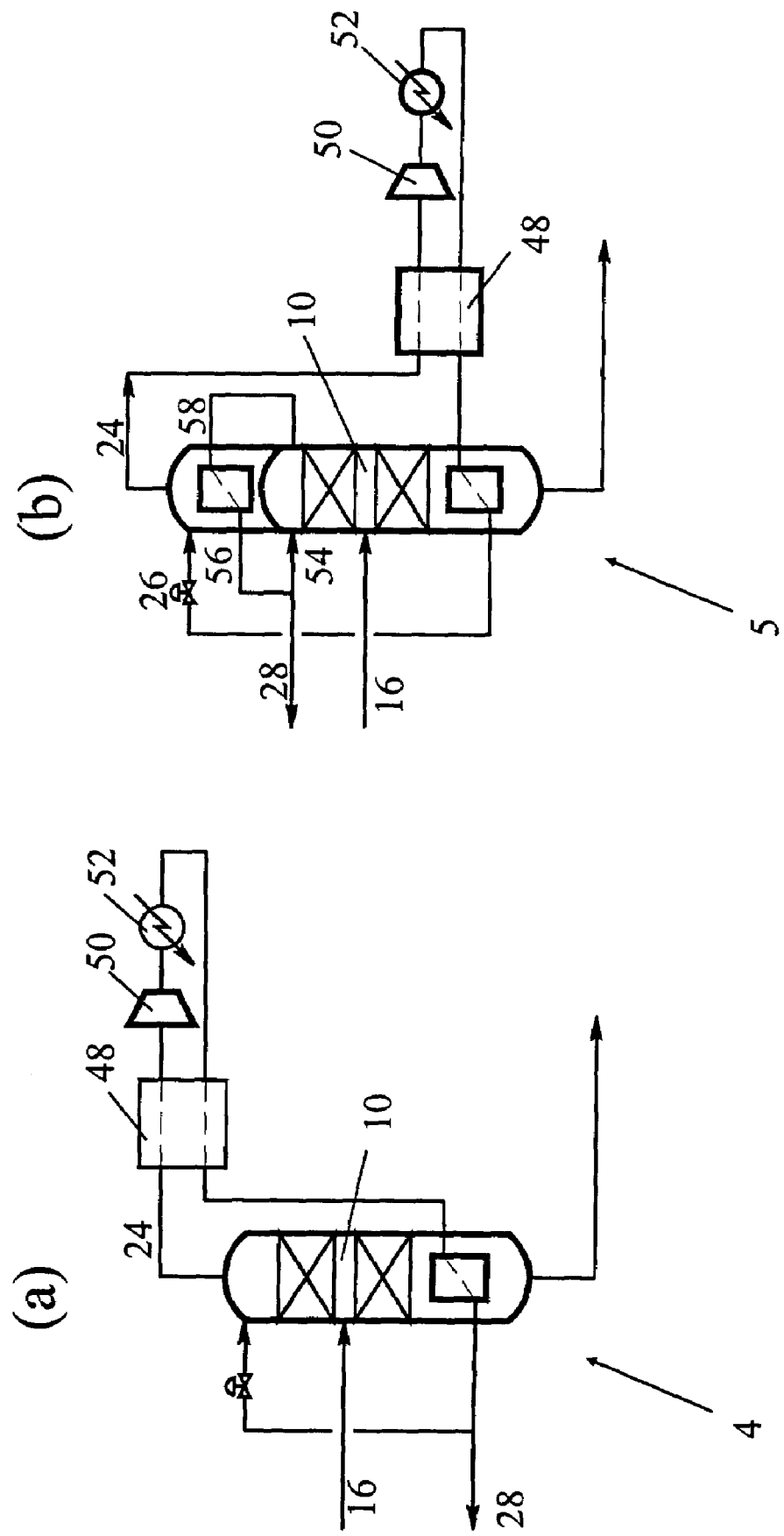
FIGS. 2A and 2B are variations of heat integration showing a utilization of a condenser duty and reboiler duty of the first cryogenic distillation column.

Both embodiments (FIG. 1 and FIG. 3) can utilize a heat integration scheme using condenser and reboiler duties of the first cryogenic distillation column as shown in FIGS. 2A and 2B.

In one embodiment shown in FIG. 2A, the feed mixture is fed to the first cryogenic distillation column 10 via line 16 at an intermediate location. Vapor overhead output is removed vial line 24, warmed up in a warmer 48, compressed in a compressor 50, cooled in a refrigerator 52, and condensed in the bottom re-boiler to provide (1) the liquid product depleted in the compound containing isotope via line 28 and (2) the liquid reflux via line 26 to the top of the first cryogenic distillation column 10. Liquid bottom output containing for example most of HD or $^{16}O^{18}O$, present in the feed is removed from the bottom of the column via line 18.

In another embodiment shown in FIG. 2B, an external heat-pump fluid system, e.g., a closed-loop working fluid, is used to integrate duties of a condenser and a reboiler. In this case, a suitable heat-pump fluid, such as Nelium (a mixture of helium and neon), is compressed, cooled down, condensed to provide boil-up for the column, reduced in pressure, vaporized to provide reflux for the column, and warmed back to close the cycle.

In addition, several options exist for both embodiments of FIGS. 2A and 2B. Liquid hydrogen containing HD may come from a liquid hydrogen source, or it can be obtained by condensing gaseous hydrogen against boiling HD-depleted liquid product. Refrigeration may be supplied by expanding one of the gaseous streams, by supplying additional cryogenic liquid and venting a small vapor stream, by using sub-cooled liquid hydrogen feed, or may come from another source. Cold compression may replace totally or in part warm compression and economizer heat exchangers.

This invention is also directed to a process for producing an enriched mixture containing $D_2$ and/or HD. This process comprises providing a cryogenic distillation column, feeding to the cryogenic distillation column a liquid $H_2$, comprised predominantly of para-$H_2$, removing a compound depleted in $D_2$ and/or HD from the cryogenic distillation column, and removing the enriched mixture enriched in $D_2$ and/or HD from the cryogenic distillation column. Liquid hydrogen can exist in two states (ortho- and para-hydrogen) depending on a system's temperature. At cryogenic temperatures, para-$H_2$ is the predominate state and corresponds to anti-parallel electron spins as described on page 69 of Handbook of Properties of Condensed Phases of Hydrogen and Oxygen, Revised and Augmented English Edition; B. I. Verkin Editor; Hemisphere Publishing Corp. NY; 1991.

This invention is also directed to an apparatus to perform the process of the invention. In the first embodiment of the apparatus, the apparatus comprises (a) a cryogenic reaction zone adapted to produce a resulting mixture containing an isotopically enriched compound of a desired isotope; (b) a source of an enriched mixture for feeding to the cryogenic reaction zone, the enriched mixture comprising at least a compound containing the desired isotope, wherein the enriched mixture is enriched in the desired isotope above a natural abundance of the desired isotope, the source being in communication with the cryogenic reaction zone; (c) a separating vessel for separating the resulting mixture into an enriched product enriched in the isotopically enriched compound and a depleted product depleted in the isotopically enriched compound, the separating vessel being in communication with the cryogenic reaction zone; and (d) a first outlet for removing the enriched product and a second outlet for removing the depleted product, the first outlet and the second outlet being in communication with the separating vessel.

Preferred embodiments of the apparatus to perform the process of the invention are shown in FIGS. 1 and 3 as described above.

The number of distillation columns located prior to and/or after cryogenic reaction zone is not limited to one or two as described above and can be varied as needed for processing conditions.

The invention will be illustrated in more detail with reference to the following Examples, but it should be understood that the present invention is not deemed to be limited thereto.

EXAMPLE 1

Separation Deuterium from Hydrogen by Using Reactive Distillation Column

One example of the process of separation isotopes of the present invention is the process of separation deuterium from hydrogen as shown in FIG. 1. The feed hydrogen mixture (stream A) is passed to a first cryogenic distillation column to obtain an enriched mixture (stream B) comprising hydrogen, deuterium, and HD, wherein HD is present in the amount of at least 10 mol % in the bottom output 18 and an $H_2$ stream in the overhead output. The recovery of HD in the bottom output is at least 97%. The overhead output is condensed in a condenser, and at least a part of it is recycled back to the first cryogenic distillation column to provide a deuterium depleted liquid reflux. At least a part of the condensed overhead output (stream C) consisting essentially of liquid hydrogen is collected.

The first cryogenic distillation column is operated at a pressure of approximately 20 psia (137.9 KPa). The bottom output is sent to a reactive distillation column. At least a part of the bottom output is sent to the reboiler and is recycled back to the first cryogenic distillation column.

The reactive distillation column contains a cryogenic reaction zone comprising a catalyst, preferably a metal or metal oxide catalyst, such as NiO, which catalyzes the reaction of HD to form $H_2$ and $D_2$. $H_2$ and $D_2$ migrate out of the cryogenic reaction zone and are purified further in the other sections of the column. The bottom output (stream E) of the reactive distillation column is a desired product which is enriched in $D_2$ with at least 95% recovery of $D_2$. At least a part of the bottom output is sent to the reboiler and is recycled back to the reactive distillation column.

The overhead output of the reactive distillation column contains $H_2$ with trace levels of $D_2$ and HD. The overhead output is condensed in the condenser, and at least a part of it is recycled back to the reactive distillation column to provide a liquid reflux. At least a part of the condensed overhead output (stream D) is collected.

The stream flowrates, temperatures, pressures and compositions of the process are shown in Table 1.

TABLE 1

STREAM SUMMARY

|  | Stream A | Stream B | Stream C | Stream D | Stream E |
|---|---|---|---|---|---|
| Flowrate; lbmol/hr | 1000 | 2.813 | 997.187 | 2.672 | 0.141 |

TABLE 1-continued

STREAM SUMMARY

|  | Stream A | Stream B | Stream C | Stream D | Stream E |
|---|---|---|---|---|---|
| Flowrate; lb/hr | 2016.17 | 5.95 | 2010.22 | 5.39 | 0.57 |
| Flowrate; kg/hr | 914.5 | 2.69 | 911.8 | 2.44 | 0.25 |
| $H_2$; mol frac | 0.9997 | 0.9000 | 1.0000 | 0.9999 | 0.0000 |
| HD; mol frac | 0.0003 | 0.1000 | 0.0000 | 0.0000 | 0.0000 |
| $D_2$; mol frac | 0.0000 | 0.0000 | 0.0000 | 0.0001 | 1.0000 |
| Temperature; °F. | −420.6 | −421.0 | −421.2 | −421.2 | −415.2 |
| Temperature; °K | 21.71 | 21.48 | 21.37 | 21.37 | 24.71 |
| Pressure; psia | 22 | 20 | 20 | 20 | 20 |
| Pressure; kPa | 151.7 | 137.9 | 137.9 | 137.9 | 137.9 |

EXAMPLE 2

Producing Deuterium from Hydrogen by Using Cryogenic Exchange Reactor

The process of producing deuterium from hydrogen is shown in FIG. 3 wherein the exchange reaction is conducted in a cryogenic reaction zone positioned in a cryogenic vessel separate from a cryogenic column. At least two cryogenic distillation columns are necessary for this example to obtain the enriched mixture comprising hydrogen, deuterium, and HD, wherein HD is present in the amount of at least about 10 mol % and preferably at least 79 mol %. The enriched mixture is then fed to the cryogenic vessel containing the cryogenic reaction zone.

First step of the process is similar to that described in Example 1, wherein the feed (stream A) comprising hydrogen is passed to the first cryogenic distillation column. The liquid bottom output (stream B) from the first cryogenic distillation column contains approximately 10 mol % HD and essentially all the $D_2$ originally present in the feed. The bottom output is passed to a second cryogenic distillation column, which further separates $H_2$ from $HD/D_2$. $H_2$ is removed in the overhead output and the $HD/D_2$ is further concentrated in the bottom output to contain approximately 75 mol % HD.

The overhead output is condensed in a condenser, and at least a part of it is recycled back to the second distillation column to provide a liquid reflux. At least a part of the condensed overhead output (stream F) is collected.

At least a part of the bottom output is sent to the reboiler and is recycled back to the second distillation column.

The bottom output (stream G) from the second cryogenic distillation column is optionally treated in a refrigerator to form a second enriched mixture (stream H) and is fed to a cryogenic reaction zone positioned in a cryogenic exchange reactor. The cryogenic reaction zone contains a metal or metal oxide heterogeneous catalyst to carry out the isotope exchange reaction of 2 HD→$H_2$+$D_2$ and to form the resulting mixture (stream I) containing preferably 32 mol % $H_2$, 16 mol % HD, and 52 mol % $D_2$. Next, the resulting mixture is fed to a third cryogenic distillation column for further separation. The overhead output (stream K) comprises $H_2$ and an unreacted HD. At least a portion of the overhead output is further condensed in the condenser and is recycled back (stream L) to the feed of the second cryogenic distillation column. In addition, at least a portion of the overhead output is returned back to the third cryogenic distillation column as a reflux.

At least a part of the bottom output is sent to a reboiler and is recycled back to the third distillation column. The bottom output containing $D_2$ (stream J) is collected.

The stream flowrates, temperatures, pressures, and compositions are shown in Table 2.

TABLE 2

STREAM SUMMARY

|  | Stream A | Stream B | Stream C | Stream F | Stream G | Stream H | Stream I | Stream J | Stream K | Stream L |
|---|---|---|---|---|---|---|---|---|---|---|
| Flowrate; lbmol/hr | 1000 | 2.813 | 997.187 | 2.672 | 0.375 | 0.375 | 0.375 | 0.141 | 0.234 | 0.234 |
| Flowrate; lb/hr | 2016.17 | 5.95 | 2010.22 | 5.39 | 1.23 | 1.23 | 1.23 | 0.57 | 0.66 | 0.66 |
| $H_2$ mol frac | 0.9997 | 0.9000 | 1.0000 | 0.9998 | 0.0010 | 0.0010 | 0.3755 | 0.0048 | 0.5992 | 0.5992 |
| HD mol frac | 0.0003 | 0.1000 | 0.0000 | 0.0002 | 0.7493 | 0.7493 | 0.0004 | 0.0002 | 0.0005 | 0.0005 |
| $D_2$ mol frac | 0.0000 | 0.0000 | 0.0000 | 0.0000 | 0.2497 | 0.2497 | 0.6242 | 0.9950 | 0.4003 | 0.4003 |
| Temperature; °F. | −420.6 | −421.0 | −421.2 | −421.2 | −417.2 | −321.07 | −321.07 | −415.931 | −418.547 | −418.547 |
| Pressure; psia | 22 | 20 | 20 | 20 | 20 | 20 | 20 | 18 | 18 | 20 |

EXAMPLE 3

Separation $^{18}O_2$ from $^{16}O_2$ by Using Cryogenic Exchange Reactor

A feed mixture comprising oxygen and a natural abundance of oxygen isotopes was fed to the cryogenic distillation column to obtain the enriched mixture. Next, the enriched mixture was removed from the bottom portion of the first cryogenic distillation column. The overhead output containing about 99.99% was removed from the first overhead portion of the first cryogenic distillation column. The column was operated at a pressure greater than atmospheric.

The enriched mixture, which is enriched in $^{16}O^{18}O$, was fed to the second cryogenic distillation column 60 for further enrichment as shown in FIG. 3. The overhead output from the second distillation column contained 99.98% $^{16}O_2$. The bottom output from the second distillation column, which is the second enriched mixture, contained 58.5% $^{16}O_2$, 39.5% $^{16}O^{18}O$ and the remainder was $^{18}O_2$. The second enriched was fed to the cryogenic reaction zone positioned in the cryogenic vessel e.g., an exchange reactor, containing a metal or metal oxide heterogeneous catalyst to carry out the isotope exchange reaction of $2\ ^{16}O^{18}O = ^{16}O_2 + ^{18}O_2$. The output from the cryogenic vessel 80 was further separated in the third cryogenic distillation column wherein the purified $^{18}O_2$ was removed in the bottom output. The distillate containing $^{16}O_2$ and $^{16}O^{18}O$ was recycled back to the feed of the second cryogenic distillation column to enhance recovery of $^{18}O_2$. The representative stream flowrates, temperatures, pressures and compositions are shown in the Table 3 below.

TABLE 3

|  | First Distillation Column | Second Distillation Column | Exchange Reactor | Third Distillation Column |
|---|---|---|---|---|
| Overhead Output |  |  |  |  |
| Temperature (F.) | −291.6 | −291.6 |  | −291.6 |
| Pressure (psia) | 20 | 20 |  | 20 |
| Flowrate (lbmol/hr) | 696.7 | 300.9 |  | 10.6 |
| $^{16}O_2$ (mol frac) | 0.9999 | 0.9998 |  | 0.995 |
| $^{16}O^{18}O$ (mol frac) | trace | trace |  | 0.005 |
| $^{18}O_2$ (mol frac) | trace | trace |  | trace |
| Bottom Output |  |  |  |  |
| Temperature (F.) | −291.7 | −289.4 |  | −287.8 |
| Pressure (psia) | 21 | 22 |  | 22 |
| Flowrate (lbmol/hr) | 303.3 | 12.97 |  | 2.35 |
| $^{16}O_2$ (mol frac) | 0.984 | 0.585 |  | trace |
| $^{16}O^{18}O$ (mol frac) | 0.156 | 0.395 |  | trace |
| $^{18}O_2$ (mol frac) | trace | 0.02 |  | 0.999 |
| Exchange Reactor's Effluent |  |  |  |  |
| Temperature (F.) |  |  | −289 |  |
| Pressure (psia) |  |  | 20 |  |
| $^{16}O_2$ (mol frac) |  |  | 0.756 |  |
| $^{16}O^{18}O$ (mol frac) |  |  | 0.023 |  |
| $^{18}O_2$ (mol frac) |  |  | 0.201 |  |

EXAMPLE 4

Separation $^{18}O_2$ from $^{16}O_2$ by Using Reactive Distillation Column

A feed mixture comprising oxygen and a natural abundance of oxygen isotopes was fed to the cryogenic distillation column 10 to obtain the enriched mixture as described in the Example 3 above.

The liquid bottom output from first cryogenic distillation column was fed to the second cryogenic distillation column as described in the Example 3. The second cryogenic distillation column removed $^{16}O_2$ as a distillate purge stream and concentrated $^{16}O^{18}O/^{18}O_2$ in the bottom output. The bottom output of second cryogenic distillation column was fed to the reactive distillation column containing an intermediate section packed with a metal or metal oxide catalyst. In the reactive distillation column, $^{16}O^{18}O$ concentrated in the intermediate section and reacts to form $^{16}O_2$ and $^{18}O_2$ which were removed as they were formed due to boiling point differences. The stream flowrates, temperatures, pressures and compositions are shown in the Table 4 below.

TABLE 4

|  | First Distillation Column | Second Distillation Column | Reactive Distillation Column |
|---|---|---|---|
| Overhead Output |  |  |  |
| Temperature (F.) | −291.6 | −291.6 | −291.6 |
| Pressure (psia) | 20 | 20 | 20 |
| Flowrate (lbmol/hr) | 696.7 | 300.9 | 10.6 |
| $^{16}O_2$ (mol frac) | 0.9999 | 0.9998 | 0.995 |
| $^{16}O^{18}O$ (mol frac) | trace | trace | 0.005 |
| $^{18}O_2$ (mol frac) | trace | trace | trace |
| Bottom Output |  |  |  |
| Temperature (F.) | −291.7 | −289.4 | −289.6 |
| Pressure (psia) | 21 | 22 | 20 |
| Flowrate (lbmol/hr) | 303.3 | 12.47 | 2.36 |
| $^{16}O_2$ (mol frac) | 0.984 | 0.618 | trace |
| $^{16}O^{18}O$ (mol frac) | 0.156 | 0.381 | 0.005 |
| $^{18}O_2$ (mol frac) | trace | trace | 0.995 |

While the invention has been described in detail and with reference to specific examples thereof, it will be apparent to one skilled in the art that various changes and modifications can be made therein without departing from the spirit and scope thereof.

The invention claimed is:

1. A process for producing an isotopically enriched compound of a desired isotope, comprising:
   (a) providing a cryogenic reaction zone containing a catalyst adapted to catalyze an isotope exchange reaction at a cryogenic reaction temperature;
   (b) feeding to the cryogenic reaction zone an enriched mixture comprising at least a compound containing the desired isotope, wherein the enriched mixture is enriched in the desired isotope above a natural abundance of the desired isotope;
   (c) reacting the enriched mixture in the cryogenic reaction zone thereby forming a resulting mixture containing the isotopically enriched compound; and
   (d) separating the resulting mixture into an enriched product which is enriched in the isotopically enriched compound and a depleted product which is depleted in the isotopically enriched compound;
   (e) providing a reactive distillation column, wherein the cryogenic reaction zone is positioned within the reactive distillation column for facilitating simultaneously the reacting process in (c) and the separating process in (d).

2. The process of claim 1, wherein the enriched mixture is present in an enriched mixture amount of at least about 1 mol %.

3. The process of claim 1, wherein the cryogenic reaction temperature is less than about 125° K and a pressure in the cryogenic reaction zone is below about 30 psia.

4. The process of claim 1, wherein the cryogenic reaction temperature is less than about 75° K and the pressure in the cryogenic reaction zone is below about 30 psia.

5. The process of claim 1, wherein the desired isotope is a member selected from a group consisting of H, D, T, $^{16}O$, $^{17}O$, and $^{18}O$, the compound containing the desired isotope is a member selected from a group consisting of HD, HT, DT, $^{16}O^{18}O$, $^{16}O^{17}O$, and the isotopically enriched compound is a member selected from a group consisting of $H_2$, $D_2$, $T_2$, $^{16}O_2$, $^{17}O_2$, and $^{18}O_2$.

6. The process of claim 1, further comprising:
providing a first cryogenic distillation column, the first cryogenic distillation column having a first bottom portion and a first overhead portion;
feeding to the first cryogenic distillation column a feed mixture comprising the compound containing the desired isotope in a feed isotope amount;
separating at least a portion of the compound containing the desired isotope, thereby obtaining the enriched mixture and a depleted mixture, wherein the depleted mixture is depleted in the compound containing the desired isotope;
removing the enriched mixture from the first cryogenic distillation column; and
removing the depleted mixture from the first cryogenic distillation column.

7. The process of claim 6, wherein at least a portion of the enriched mixture and/or at least a portion of the depleted mixture are returned to the first cryogenic distillation column to provide a liquid reflux, thereby recycling the at least a portion of the enriched mixture and/or the at least a portion of the depleted mixture.

8. The process of claim 7, wherein the liquid reflux is obtained by
compressing the at least a portion of the enriched mixture or the at least a portion of the depleted mixture, thereby forming a compressed overhead output;
condensing the compressed overhead output, thereby forming a condensed overhead product;
transferring heat of condensation to the first bottom portion of the first cryogenic distillation column, thereby providing boilup; and
returning at least a portion of the condensed overhead product to the first overhead portion of the first cryogenic distillation.

9. The process of claim 7, wherein the liquid reflux is obtained by
condensing at least a portion of the enriched mixture or the at least a portion of the depleted mixture against a boiling refrigerant;
compressing the boiling refrigerant; and
condensing the boiling refrigerant by transferring heat to the first bottom portion of the first cryogenic distillation column, thereby providing boilup.

10. The process of claim 6, wherein the feed mixture is a gas fed at a temperature of about 125° K to about 19° K at a pressure of below about 30 psia.

11. The process of claim 6, wherein the feed mixture is a cryogenic liquid fed at a temperature of about 125° K to about 19° K at a pressure of below about 30 psia.

12. The process of claim 6, wherein the cryogenic reaction temperature is at most about 75° K at a pressure of below about 30 psia.

13. The process of claim 6, wherein the cryogenic reaction temperature is at most about 22° K at a pressure of below about 30 psia.

14. The process of claim 6, wherein the enriched product contains at least 95% of the isotopically enriched compound.

15. The process of claim 6, wherein the isotopically enriched compound is $D_2$, the compound containing the desired isotope is HD, and the desired isotope is D.

16. The process of claim 15, wherein the feed mixture comprises at least 50% of para-$H_2$.

17. The process of claim 6, wherein the isotopically enriched compound is $^{18}O_2$, the compound containing the desired isotope is $^{16}O^{18}O$, and the desired isotope is $^{18}O$.

18. The process of claim 6, further comprising:
providing a second cryogenic distillation column having a second bottom portion and a second overhead portion and a third cryogenic distillation column having a third bottom portion and a third overhead portion;
feeding the enriched mixture from the first cryogenic distillation column to the second distillation column;
separating at least a portion of the compound containing the desired isotope from the enriched mixture, thereby forming a second enriched mixture comprising at least a compound containing the desired isotope and a second depleted mixture, wherein the second depleted mixture is depleted in the compound containing the desired isotope, provided that the second enriched mixture is enriched in the desired isotope in a second enriched mixture amount which exceeds the enriched mixture amount;
removing the second enriched mixture from the second cryogenic distillation column;
feeding the second enriched mixture to the cryogenic reaction zone, provided that the cryogenic reaction zone is positioned in a cryogenic vessel, thereby forming the resulting mixture containing the isotopically enriched compound;
directing the resulting mixture to the third cryogenic distillation column, thereby obtaining the enriched product and the depleted product;
collecting the enriched product from the reactive distillation column; and
removing the depleted product from the reactive distillation column.

19. The process of claim 18, wherein at least a portion of the enriched mixture and/or at least a portion of the depleted mixture are returned to the first cryogenic distillation column to provide a liquid reflux, thereby recycling the at least a portion of the enriched mixture and/or the at least a portion of the depleted mixture.

20. The process of claim 19, wherein the liquid reflux is obtained by
compressing the at least a portion of the enriched mixture or the at least a portion of the depleted mixture, thereby forming a compressed overhead output;
condensing the compressed overhead output, thereby forming a condensed overhead product;
transferring heat of condensation to the first bottom portion of the first cryogenic distillation column, thereby providing boilup; and
returning at least of portion of the condensed overhead product to the first overhead portion of the first cryogenic distillation.

21. The process of claim 19, wherein the liquid reflux is obtained by
condensing at least a portion of the enriched mixture or the at least a portion of the depleted mixture against a boiling refrigerant;
compressing the boiling refrigerant; and
condensing the boiling refrigerant by transferring heat to the first bottom portion of the first cryogenic distillation column, thereby providing boilup.

22. The process of claim 18, wherein the feed mixture is a gas fed at a temperature of about 125° K to about 19° K at a pressure of below about 30 psia.

23. The process of claim 18, wherein the feed mixture is a cryogenic liquid fed at a temperature of about 125° K to about 19° K at a pressure of below about 30 psia.

24. The process of claim 18, wherein the cryogenic reaction temperature is at most about 75° K at a pressure of below about 30 psia.

25. The process of claim 18, wherein the cryogenic reaction temperature is at most about 22° K at a pressure of below about 30 psia.

26. The process of claim 18, wherein the enriched product contains at least 95% of the isotopically enriched compound.

27. The process of claim 18, wherein the isotopically enriched compound is $D_2$, the compound containing the desired isotope is HD, and the desired isotope is D.

28. The process of claim 18, wherein the feed mixture comprises at least 50% of para-$H_2$.

29. The process of claim 18, wherein the isotopically enriched compound is $^{18}O_2$, the compound containing the desired isotope is $^{16}O^{18}O$, and the desired isotope is $^{18}O$.

30. A process for producing an enriched mixture containing $D_2$ and/or ND and liquid hydrogen stream depleted in $D_2$ and/or HD, the process comprising:
   providing a cryogenic distillation column;
   feeding to the cryogenic distillation column a liquid hydrogen stream comprising predominantly para-$H_2$ and at least one of $D_2$ and HD;
   removing the liquid hydrogen stream depleted in $D_2$ and/or HD from the cryogenic distillation column; and
   removing the enriched mixture enriched in $D_2$ and/or HD from the cryogenic distillation column.

31. The process of claim 30, wherein the enriched mixture is further enriched in $D_2$ by providing a cryogenic reaction zone containing a catalyst adapted to catalyze an isotope exchange reaction.

32. An apparatus adapted to perform the process of claim 1, said apparatus comprising:
   (a) a cryogenic reaction zone adapted to produce a resulting mixture containing an isotopically enriched compound of a desired isotope;
   (b) a source of an enriched mixture for feeding to the cryogenic reaction zone, the enriched mixture comprising at least a compound containing the desired isotope, wherein the enriched mixture is enriched in the desired isotope above a natural abundance of the desired isotope, the source being in communication with the cryogenic reaction zone;
   (c) a separating vessel for separating the resulting mixture into an enriched product enriched in the isotopically enriched compound and a depleted product depleted in the isotopically enriched compound, the separating vessel being in communication with the cryogenic reaction zone; and
   (d) a first outlet for removing the enriched product and a second outlet for removing the depleted product, the first outlet and the second outlet being in communication with the separating vessel.

33. An apparatus for producing an isotopically enriched compound of a desired isotope, said apparatus comprising:
   (a) a cryogenic reaction zone containing a catalyst adapted to catalyze an isotope exchange reaction at a cryogenic reaction temperature, the cryogenic reaction zone is adapted to produce a resulting mixture containing the isotopically enriched compound;
   (b) a source of an enriched mixture for feeding to the cryogenic reaction zone, the enriched mixture comprising at least a compound containing the desired isotope, wherein the enriched mixture is enriched in the desired isotope above a natural abundance of the desired isotope, the source being in communication with the cryogenic reaction zone;
   (c) a cryogenic distillation column for separating the resulting mixture into an enriched product enriched in the isotopically enriched compound and a depleted product depleted in the isotopically enriched compound, the cryogenic distillation column being in communication with the cryogenic reaction zone; and
   (d) a first outlet for removing the enriched product and a second outlet for removing the depleted product, the first outlet and the second outlet being in communication with the separating vessel.

34. The apparatus of claim 33, wherein the source of the enriched mixture comprises a first cryogenic distillation column, the first cryogenic distillation column having a first bottom portion and a first overhead portion, and wherein the first cryogenic distillation column is adapted to receive a feed mixture comprising the compound containing the desired isotope in a feed isotope amount and to separate at least a portion of the compound containing the desired isotope, and thereby obtain the enriched mixture and a depleted mixture, the depleted mixture is depleted in the compound containing the desired isotope.

35. The apparatus of claim 34, wherein the separating vessel comprises a reactive distillation column adapted to contain the cryogenic reaction zone within the reactive distillation column, wherein the reactive distillation column has a catalytic and a non-catalytic inner contacting surface for facilitating simultaneously an isotope exchange reaction and a distillation process, and wherein reacting the enriched mixture and separating the enriched product and the depleted product are conducted simultaneously in the reactive distillation column.

36. The apparatus of claim 35, further comprising a recycling unit, the recycling unit adapted to return at least a portion of the enriched mixture and/or at least a portion of the depleted mixture to the first cryogenic distillation column to provide a liquid reflux.

37. The apparatus of claim 36, wherein the recycling unit comprises:
   a compressor to compress the at least a portion of the enriched mixture or the at least a portion of the depleted mixture, and thereby form a compressed overhead output;
   a condenser to condense the compressed overhead output, and thereby form a condensed overhead product;
   a conduit for transferring heat of condensation to the first bottom portion of the first cryogenic distillation column, and thereby providing boilup; and
   a conduit for returning at least a portion of the condensed overhead product to the first overhead portion of the first cryogenic distillation.

38. The apparatus of claim 36, wherein the recycling unit comprises:
   a condenser adapted to condense at least a portion of the enriched mixture or the at least a portion of the depleted mixture against a boiling refrigerant;
   a compressor adapted to compress the boiling refrigerant; and
   a conduit for condensing the boiling refrigerant by transferring heat to the first bottom portion of the first cryogenic distillation column, and thereby providing boilup.

39. The apparatus of claim 34, further comprising:
   a second cryogenic distillation column having a second bottom portion and a second overhead portion, the second distillation column being in communication with the first distillation column and adapted to produce a second enriched mixture comprising at least a compound containing the desired isotope and a second depleted mixture, wherein the second depleted mixture is depleted in the compound containing the desired isotope, provided that the second enriched mixture is enriched in the desired isotope in a second enriched mixture amount which exceeds the enriched mixture amount;

a cryogenic vessel adapted to contain the cryogenic reaction zone, the cryogenic vessel is in communication with the second cryogenic distillation column; and a third cryogenic distillation column having a third bottom portion and a third overhead portion, the third cryogenic distillation column adapted to serve as the separating vessel, the third cryogenic distillation column being in communication with the cryogenic vessel.

40. The apparatus of claim 39, further comprising a recycling unit, the recycling unit adapted to return at least a portion of the enriched mixture and/or at least a portion of the depleted mixture to the first cryogenic distillation column to provide a liquid reflux.

41. The apparatus of claim 40, wherein the recycling unit comprises:
a compressor adapted to compress the at least a portion of the enriched mixture or the at least a portion of the depleted mixture, and thereby form a compressed overhead output;
a condenser adapted to condense the compressed overhead output, and thereby form a condensed overhead product;
a conduit for transferring heat of condensation to the first bottom portion of the first cryogenic distillation column, and thereby providing boilup; and
a conduit for returning at least a portion of the condensed overhead product to the first overhead portion of the first cryogenic distillation.

42. The apparatus of claim 40, wherein the recycling unit comprises:
a condenser adapted to condense at least a portion of the enriched mixture or the at least a portion of the depleted mixture against a boiling refrigerant;
a compressor to compress the boiling refrigerant; and
a conduit for condensing the boiling refrigerant by transferring heat to the first bottom portion of the first cryogenic distillation column, and thereby providing boilup.

43. An apparatus for producing an enriched mixture containing $D_2$ and/or HD, the apparatus comprising:
a cryogenic distillation column;
a source of a liquid $H_2$, wherein the liquid $H_2$ comprises predominantly para-$H_2$, the source being in communication with the cryogenic distillation column; and
a first outlet for removing said liquid $H_2$ depleted in $D_2$ and/or HD and a second outlet for removing the enriched mixture enriched in $D_2$ and/or HD, the first outlet and the second outlet being in communication with the cryogenic distillation column.

44. The apparatus of claim 43, further comprising a cryogenic reaction zone containing a catalyst adapted to catalyze an isotope exchange reaction.

45. An apparatus for producing an isotopically enriched compound of a desired isotope, comprising:
(a) a cryogenic reaction zone containing a catalyst adapted to catalyze an isotope exchange reaction at a cryogenic reaction temperature;
(b) means for feeding to the cryogenic reaction zone an enriched mixture comprising at least a compound containing the desired isotope, wherein the enriched mixture is enriched in the desired isotope above a natural abundance of the desired isotope;
(c) means for reacting the enriched mixture in the cryogenic reaction zone thereby forming a resulting mixture containing the isotopically enriched compound; and
(d) a cryogenic distillation column for separating the resulting mixture into an enriched product which is enriched in the isotopically enriched compound and a depleted product which is depleted in the isotopically enriched compound.

46. An apparatus for producing an enriched mixture containing $D_2$ and/or HD comprising:
a cryogenic distillation column;
means for feeding to the cryogenic distillation column a liquid hydrogen stream comprising predominantly para-$H_2$ and at least one of $D_2$ and HD;
means for removing said liquid $H_2$ depleted in $D_2$ and/or HD from the cryogenic distillation column; and
means for removing the enriched mixture enriched in $D_2$ and/or HD from the cryogenic distillation column.

47. A process for producing an enriched mixture containing $D_2$ and/or HD and a liquid hydrogen stream depleted in essentially all $D_2$ and/or HD, the process comprising:
providing a cryogenic distillation column;
feeding to the cryogenic distillation column a liquid hydrogen stream comprising predominantly para-$H_2$ and at least one of $D_2$ and HD;
removing the liquid hydrogen stream depleted in essentially all the $D_2$ and/or HD originally present in the feed; and
removing the enriched mixture enriched in $D_2$ and/or HD from the cryogenic distillation column.

48. The process of claim 47, wherein the feed comprises at least 50% para-hydrogen.

49. A process for producing an isotopically enriched compound of a desired isotope, comprising:
(a) providing a cryogenic reaction zone containing a catalyst adapted to catalyze an isotope exchange reaction at a cryogenic reaction temperature;
(b) feeding to the cryogenic reaction zone an enriched mixture comprising at least a compound containing the desired isotope, wherein the enriched mixture is enriched in the desired isotope above a natural abundance of the desired isotope;
(c) reacting the enriched mixture in the cryogenic reaction zone thereby forming a resulting mixture containing the isotopically enriched compound; and
(d) providing a cryogenic distillation column to separate the resulting mixture into an enriched product which is enriched in the isotopically enriched compound and a depleted product which is depleted in the isotopically enriched compound in the at least one cryogenic distillation column.

* * * * *